US009680170B2

(12) United States Patent
Barton

(10) Patent No.: US 9,680,170 B2
(45) Date of Patent: Jun. 13, 2017

(54) GAS GENERATOR WITH COMBINED GAS FLOW VALVE AND PRESSURE RELIEF

(75) Inventor: Russell H. Barton, New Westminster (CA)

(73) Assignee: Intelligent Energy Inc., San Jose, CA (US)

(*) Notice: Subject to any disclaimer, the term of this patent is extended or adjusted under 35 U.S.C. 154(b) by 1165 days.

(21) Appl. No.: 13/460,866

(22) Filed: May 1, 2012

(65) Prior Publication Data
US 2013/0017459 A1    Jan. 17, 2013

Related U.S. Application Data

(60) Provisional application No. 61/506,351, filed on Jul. 11, 2011.

(51) Int. Cl.
H01M 8/06        (2016.01)
H01M 8/04082     (2016.01)
H01M 8/04746     (2016.01)
B01J 7/02        (2006.01)
C01B 3/06        (2006.01)
F16K 17/04       (2006.01)

(52) U.S. Cl.
CPC ........... H01M 8/04201 (2013.01); B01J 7/02 (2013.01); C01B 3/065 (2013.01); F16K 17/0486 (2013.01); H01M 8/04776 (2013.01); H01M 8/04208 (2013.01); Y02E 60/362 (2013.01)

(58) Field of Classification Search
CPC .............. H01M 8/04208; F16K 17/044; F16K 17/0486
See application file for complete search history.

(56) References Cited

U.S. PATENT DOCUMENTS 3,005,577 A    10/1961  Webster
5,036,878 A     8/1991  Fournillon et al.
5,884,655 A     3/1999  Ostand
(Continued)

FOREIGN PATENT DOCUMENTS

CN          1910803 A       2/2007
WO      WO 2005/069882 A2   8/2005

OTHER PUBLICATIONS

Patent Cooperation Treaty (PCT), International Search Report and Written Opinion for Application No. PCT/US2012/035923, filed May 1, 2012, mailed Jul. 27, 2012, European Patent Office, Netherlands.

Primary Examiner — Barbara Gilliam
Assistant Examiner — Stephan Essex
(74) Attorney, Agent, or Firm — Baker & Hostetler LLP

(57) ABSTRACT

A gas generator includes a reactant capable of producing a gas and a gas outlet valve that can function as both a gas flow valve and a pressure relief vent, using the same gas flow path through the valve. When the valve is closed and the pressure within the gas generator is below a threshold pressure, a moveable valve member is biased against a valve seat to block the outlet port. When gas generator is coupled to the apparatus, an actuator is inserted into the valve, displacing the moveable valve member and separating it from the valve seat to open the valve. When the gas generator is uncoupled, pressure at or above a threshold displaces the moveable member, separating it from the valve seat to open the outlet port so pressure can be released to the external environment.

17 Claims, 3 Drawing Sheets

(56) References Cited

U.S. PATENT DOCUMENTS

| | | | |
|---|---|---|---|
| 6,713,201 | B2 | 3/2004 | Bullock et al. |
| 6,924,054 | B2 | 8/2005 | Prasad et al. |
| 7,052,788 | B2 | 5/2006 | McClelland et al. |
| 2005/0116190 | A1* | 6/2005 | Adams et al. ............... 251/144 |
| 2005/0162122 | A1 | 7/2005 | Dunn et al. |
| 2006/0059778 | A1* | 3/2006 | Shurtleff et al. ............. 48/61 |
| 2008/0169207 | A1 | 7/2008 | Kaye |
| 2008/0171258 | A1* | 7/2008 | Takahashi et al. ........... 429/35 |
| 2008/0233446 | A1 | 9/2008 | Zimmermann et al. |
| 2009/0035624 | A1 | 2/2009 | Kobayashi |
| 2009/0169960 | A1 | 7/2009 | Nakamura |
| 2009/0274595 | A1 | 11/2009 | Fisher et al. |
| 2013/0133761 | A1* | 5/2013 | Cull ...................... B65D 83/70 137/528 |

* cited by examiner

GAS GENERATOR WITH COMBINED GAS FLOW VALVE AND PRESSURE RELIEF

CROSS REFERENCE TO RELATED APPLICATIONS

This application claims the benefit of U.S. Provisional Application No. 61/506,351, filed on Jul. 11, 2011.

BACKGROUND

This invention relates to a gas generator, such as a hydrogen generator, particularly a gas generator with a gas flow valve that also functions as a pressure relief valve.

Interest in fuel cell batteries as power sources for portable electronic devices has grown. A fuel cell is an electrochemical cell that uses materials from outside the cell as the active materials for the positive and negative electrode. Because a fuel cell does not have to contain all of the active materials used to generate electricity, the fuel cell can be made with a small volume relative to the amount of electrical energy produced compared to other types of batteries.

There are several types of fuel cells, each using a different chemistry. Fuel cells can be categorized according to the type of electrolyte used, typically one of five types: proton exchange membrane fuel cell (PEMFC), alkaline fuel cell (AFC), phosphoric-acid fuel cell (PAFC), solid oxide fuel cell (SOFC) and molten carbonate fuel cell (MCFC). Each of these types of fuel cell uses hydrogen and oxygen. Hydrogen is oxidized at the negative electrode, and oxygen is reduced at the positive electrode. Ions pass through an electrically nonconductive, ion permeable separator and electrons pass through an external circuit to provide an electric current.

In some types of hydrogen fuel cells, hydrogen is formed from a hydrogen-containing fuel supplied to the negative electrode side of the fuel cell. In other types of hydrogen fuel cells, hydrogen gas is supplied to the fuel cell from a source outside the fuel cell.

A fuel cell system can include a fuel cell battery, including one or more fuel cells (a fuel cell stack), and a gas source, such as a gas tank or a gas generator. Gas generators that supply gas to a fuel cell can be an integral part of a fuel cell system, or they can be removably coupled to the fuel cell system. A removable gas generator can be replaced with another one when the gas producing reactants have been consumed. Removable gas generators can be disposable (intended for only a one-time use) or refillable (intended for use multiple times) to replace consumed reactant materials.

It is desirable for removable gas generators to be easily coupled to the fuel cell system to create a gas flow path from the gas generator to the remainder of the fuel cell system without gas leaks at the coupling, and it is also desirable for the gas generator to be free of gas leaks when not coupled to the remainder of the fuel cell system. The coupling between the gas generator and the rest of the fuel cell system can include one or more valves. The valve(s) can be opened and closed manually, valve operation can be controlled by a control system, or the valve(s) can be opened and closed by an actuator that is operated by making or separating components of the coupling. The latter method can be used in quick disconnect couplings, for example, where the valve is opened when the gas generator is coupled to the rest of the system and closed when the gas generator is uncoupled.

Because the gas generator can contain gas under pressure, it may be desirable to provide means for relieving internal pressure before it becomes high enough to rupture the gas generator housing. A pressure relief vent can be incorporated into the gas generator for this purpose. Examples of pressure relief vents are found in U.S. Patent Publication No. 2006/0174951 A1, in which the pressure relief vent is located in a portion of the gas generator housing, and in U.S. Patent Publication No. 2008/0169207 A1, in which the pressure relief vent is incorporated into a valve assembly that also controls the flow of gas from the hydrogen generator.

Another example of a pressure relief vent incorporated into the valve assembly is found in U.S. Patent Publication No. 2005/0162122 A1. In this valve assembly, if the internal pressure reaches a predetermined level when the gas generator is not coupled to the rest of the fuel cell system, a burst disk opens to relieve the pressure. Gas is released through a portion of the same conduit through which gas flows when the gas generator is coupled to the rest of the fuel cell system.

An object of the present invention is to provide a gas generator that can be reliably sealed to prevent gas leaks when coupled to or uncoupled from a from a fuel cell system and that can provide a pressure relief vent when the gas generator is uncoupled.

SUMMARY

The above objects are met and the above disadvantages of the prior art are overcome by the present invention, which includes a gas generator that can be removed from the remainder of a fuel cell system and has an improved valve assembly. The valve assembly includes a gas outlet valve that can open when the gas generator is coupled to the fuel cell system, close when the gas generator is uncoupled, and provide a pressure relief vent in a simple design with a small number of component parts.

Accordingly, a first aspect of the present invention is a gas generator for supplying a gas to an apparatus. The gas generator includes a housing, a reactant contained within an interior portion of the housing and capable of reacting to produce a gas, and a gas outlet valve. The gas outlet valve includes a valve body, a valve seat, a moveable valve member, a biasing member, a gas inlet port, a gas outlet port, and a gas flow path through the valve body, the gas flow path including the gas inlet port and the gas outlet port. When the gas outlet valve is in a closed configuration and a pressure within the gas generator is below a threshold pressure, the moveable valve member is biased by the biasing member against the valve seat to block the outlet port. When the gas outlet valve is in a gas supplying configuration, the moveable valve member is displaced by an actuator, insertable into the gas outlet valve from outside the gas generator, such that the moveable valve member is separated from the valve seat and the outlet port is open so gas can be supplied through the gas flow path to the apparatus. When the gas outlet valve is in a pressure relief configuration, the pressure within the gas generator is at or above the threshold pressure, and the moveable valve member is separated from the valve seat and the outlet port is open so pressure can be released through the gas flow path to an external environment. The gas can flow through the same gas flow path when the valve is in both the gas supplying configuration and the pressure relief configuration.

Embodiments of the first aspect of the invention can include one or more of the following features:

the biasing member comprises a spring;

the gas outlet valve includes a seal member that forms a seal between the valve seat and the moveable valve member when the gas outlet valve is in the closed configuration;

the moveable valve member includes a piston that is linearly moveable along a longitudinal axis of the valve;

the gas generator has no additional pressure relief vent; and the gas produced includes hydrogen gas.

A second aspect of the invention is a fuel cell system including a gas generator as described above and a fuel cell stack.

Embodiments of the second aspect of the invention can include one or more of the following features:

the fuel cell system further includes a coupling between the gas generator and the fuel cell stack, and the coupling includes the actuator; the actuator displaces the moveable valve member to open the gas outlet port when the gas outlet valve is in the gas supplying configuration; the actuator can include a hollow tube in fluid communication with the fuel cell, a seal can be formed between an outer surface of the tube and the valve seat when the actuator is inserted into the gas outlet valve, and gas exiting the gas outlet in the valve can enter the hollow tube;

the gas generator includes a valve assembly that includes the gas outlet valve; the valve assembly can include a plurality of valves; the valve assembly can include a fluid outlet valve and a fluid inlet valve, and the fuel cell system can include a pump disposed outside the gas generator and configured to transfer a fluid from the fluid outlet valve to the fluid inlet valve;

the valve assembly can include an upstanding wall projecting outward from the gas generator; the gas outlet valve can be disposed radially inward of the upstanding wall; a coupling between the gas generator and the fuel cell stack includes a sleeve, within which the actuator is recessed; an interaction between the sleeve and a radially outer surface of the upstanding wall of the valve assembly provides alignment of the actuator with the gas outlet valve; and the gas generator is user-removable.

Incorporating the pressure relief vent into the valve assembly used to control the gas flow from the gas generator to the rest of the fuel cell system can reduce the number of places in the hydrogen generator housing that must be sealed to prevent gas leaks. Using at least a portion of the same gas flow path within the valve to both supply gas and to vent gas when the internal pressure reaches a threshold level can reduce the number of component parts and simplify the valve assembly. The valve assembly can be further simplified and the number of parts further reduced by using the same valve parts (e.g., valve seat, moveable valve member and gas outlet port) for both the gas flow control and pressure relief functions. The gas generator can be reused (e.g., by refilling it with fresh reactants) if venting gas to relieve internal pressure does not damage the valve so it will not perform its flow control and pressure relief function or maintain an adequate seal.

These and other features, advantages and objects of the present invention will be further understood and appreciated by those skilled in the art by reference to the following specification, claims and appended drawings.

Unless otherwise specified herein, all disclosed characteristics and ranges are as determined at room temperature (20-25° C.).

DESCRIPTION

Figure 1:
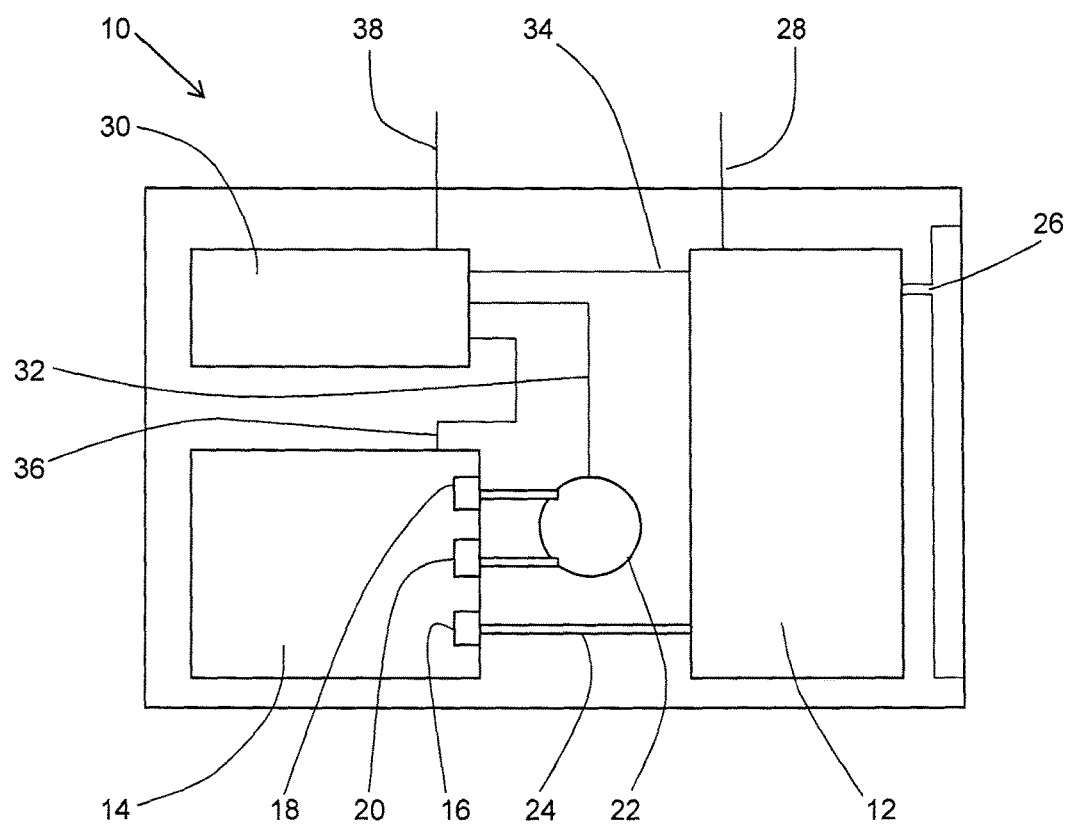
FIG. 1 is schematic diagram of a fuel cell system.

A gas generator according to the present invention can be any apparatus in which one or more reactants are reacted to produce the desired gas, which can be supplied to a fuel cell system including the gas generator as a component. The fuel cell system can be any fuel cell system that uses the gas supplied by the gas generator as an active material in an electrode of a fuel cell that is part of the system. Preferably, the gas generator is user-removable, intended to be easily removable from the fuel cell system by a user, such as when the reactants in the gas generator are substantially depleted, so the gas generator can be replaced with a new or refilled gas generator.

The type of gas produced by the gas generator can be a gas that is produced by the reaction of one or more reactants within the gas generator. An example is a hydrogen generator. Hydrogen generators can use a variety of reactants and types of reactions. At least one reactant is a hydrogen-containing compound. Hydrogen containing compounds include hydrides such as metal hydrides (e.g., sodium hydride, lithium hydride, lithium aluminum hydride), transition metal hydrides (e.g., aluminum hydride), organic (saline or ionic) hydrides (e.g., $C_6H_5C(O)CH_3$), borohydrides (e.g., sodium borohydride, ammonia borane), borates (e.g., sodium metaborate), alcohols (e.g., methanol, ethanol), organic acids (e.g., formic acid, and water. A catalyst can be used to catalyze the gas-generation reactions.

The gas generator includes a housing that contains the reactant(s) and a valve assembly. The valve assembly has a gas outlet valve that can open when the gas generator is coupled to the rest of the fuel cell system to provide a gas flow path from the interior of the gas generator to the rest of the fuel cell system (the gas supplying configuration). The gas outlet valve closes (the closed configuration) when the gas generator is uncoupled. The gas outlet valve also has a pressure relief configuration for releasing (venting) pressure from within the gas generator when it reaches or exceeds a threshold pressure. If desired, the valve assembly can include more than one gas outlet valve.

The gas outlet valve includes a valve body, a valve seat, a moveable valve member, a biasing member, a gas inlet port, a gas outlet port, and a gas flow path, including the gas inlet and outlet ports, through the valve body. The same valve seat, moveable valve member and gas outlet port are used to vent gas from the gas generator in the pressure relief configuration as are used to control the supply of gas in the gas supplying configuration.

In the closed configuration, the biasing member biases the movable valve member against the valve seat to close the gas outlet port. The gas outlet port can include a channel with an orifice on the upstream end thereof. The valve seat can be at the periphery of the orifice, where it can be contacted by the moveable valve member to close the gas outlet port. The moveable valve member can be shaped like a piston, with a projection therefrom (e.g., a valve stem) that seals against the valve seat when the valve is closed. The valve seat or the projection can include a seal member, such as an O-ring, a V-seal, or a coating of a sealing material to provide a gas-tight seal between the valve seat and the moveable valve member.

Gas from the gas generator enters a chamber defined by the valve body, the moveable valve member and the valve seat. When the gas outlet valve is closed, the moveable valve member is sealed against the valve seat to prevent the flow of gas through the outlet port and out of the gas generator.

The gas outlet valve is opened when the gas generator is coupled to the rest of the fuel cell system. The coupling can include an actuator such as a hollow tube that can fit into the gas outlet channel and push the valve stem inward against the force of the biasing member, to open the outlet port and provide a gas flow path through the gas outlet valve and the coupling. The side wall near the tip of the actuator can simultaneously seal against the valve seat to provide a gas-tight seal. The coupling can be secured in place, such as with a latching mechanism to prevent inadvertent separation of the gas generator from the rest of the fuel cell system during use. When the gas generator is removed from the rest of the fuel cell system, the actuator is withdrawn, and the biasing member biases the moveable valve member into contact with the valve seat to seal the outlet port. The moveable member can move linearly along a longitudinal axis of the valve, between the closed configuration and the gas supplying or pressure relief configuration.

When the gas generator is coupled to the rest of the fuel cell system, a pressure relief vent downstream from the gas generator (e.g., between the gas generator and the fuel cell stack) can provide protection against excessive pressure within both the gas generator and the rest of the fuel cell system, since there is an open gas flow path through the valve. However, when the gas generator is not coupled to the rest of the fuel cell system, additional protection is required. This can be provided by the valve, either instead of or in addition to another pressure relief vent. If the gas pressure within the gas generator becomes too high, pressure between the moveable valve member and the valve seat pushes the piston against the biasing member to open the valve and release the excess pressure. The amount of gas pressure required to provide this pressure relief function is dependent on the strength of the biasing member. The strength of the biasing member is selected so the valve will be forced open before the internal pressure gets high enough to cause internal damage or rupture the gas generator housing. When sufficient pressure has been released, the biasing member again biases the moving valve member against the valve seat to close the valve. As a result, a resealable pressure relief vent can be provided with the same simple valve used to open and close the valve under normal operating conditions, with no additional parts required.

The valve assembly described above can be used with many different types of gas generators. Examples include but are not limited to those disclosed in U.S. Pat. Nos. 5,804,329; 6,808,833; 6,924,054; 6,932,847; 7,097,813; 7,172,825; 7,220,290; 7,481,858; 7,655,056; and 7,674,540; U.S. Patent Publication Nos. 2007/0084115 and 2009/0274595 and U.S. patent application Ser. No. 13/021,798, filed Feb. 7, 2011, and Provisional U.S. Patent Application No. 61/477,641, filed Apr. 21, 2011.

The gas generator can interact with or be controlled using components located elsewhere. It can be especially advantageous to locate components that have relatively long lifetimes and/or relatively high costs outside of the gas generator (e.g., within other portions of the fuel cell system or the within a device being powered by the fuel cell system). For example, parts of a control system that controls the operation of the gas generator, such as electronics, pumps, etc., can be located outside the gas generator itself.

In some gas generators additional valves besides the valve providing gas to the rest of the fuel cell system may be desired. For example, if a pump used to pump a fluid (e.g., a reactant-containing liquid) from a reservoir to a reaction chamber in the gas generator is located outside the gas generator housing, the valve assembly can also include a fluid outlet valve between the fluid reservoir and the pump, as well as a fluid inlet valve between the pump and the reaction chamber. It may be convenient to incorporate these other valves into the same valve assembly as the gas outlet valve. It may also be convenient to incorporate other features, such as electrical connections between the gas generator and the rest of the fuel cell system into the valve assembly.

The gas generator is removable from the rest of the fuel cell system. It can be either disposable or reusable (refillable). A refillable gas generator will include means for inserting fresh reactants into the gas generator. While it may be possible to disassemble the gas generator housing to do this, it may be desirable to use existing valves where possible. For example, a liquid outlet valve might be used to refill a liquid reservoir with fresh liquid, eliminating the need for or reducing the amount of disassembly of the gas generator required.

The gas generator can be coupled to a fuel cell system to provide gas to be used as an active material at a fuel cell stack electrode. The fuel cell system includes the fuel cell stack, the gas generator and a gas flow path extending from inside the gas generator, through the valve to the fuel cell stack. Gas can flow into a gas manifold for distribution to electrodes of multiple fuel cells.

The fuel cell stack can include one or more fuel cells that use gas supplied by the gas generator. A common gas used by fuel cells is hydrogen, which is oxidized at the fuel cell anode. Another common gas used by fuel cells is oxygen, which is reduced at the fuel cell cathode.

A variety of methods can be used to control the operation of the gas generator to produce gas. Once the gas generator is coupled to the rest of the fuel cell system, the reactants can begin to react and continue until depleted, or gas can be generated only as needed. The need for gas can be based on one or more device characteristics (e.g., on/off, operating mode, rate of energy consumption, internal battery condition), fuel cell characteristics (e.g., voltage, amperage, power output, hydrogen gas pressure, temperature), gas generator characteristics (e.g., hydrogen gas pressure, temperature), or a combination thereof. A control system can be included in the device and/or the fuel cell system.

FIG. 1 is a schematic diagram of an embodiment of a fuel cell system. Not all components are essential, and components of the fuel cell system are not necessarily co-disposed as shown in FIG. 1 (e.g., some components may be located within an apparatus powered by the fuel cell system). Fuel cell system 10 includes a fuel cell stack 12 and a gas removable gas generator 14 for providing a reactant gas to the stack 12. The gas produced by the gas generator 14 (e.g., hydrogen) passes through a gas outlet valve 16 in the gas generator 14, and through a gas inlet 24 to the stack 12, where it is used as an active material by one electrode. Another gas, such as oxygen, enters the stack 12 through an inlet 26, where it is used as an active material by the other electrode. The stack 12 produces electricity that is provided to an electric apparatus through a power output 28. Reactants within the gas generator 14 react to produce the gas. In an embodiment a reactant in a liquid in the gas generator 14 is transferred from a reservoir to a reactant chamber where the gas is generated. The liquid can be transferred by a pump 22, which can be disposed within or outside the gas generator housing. If the pump 22 is within the gas generator housing, fewer external connections are needed, but if the pump 22 is an external pump, it can continue to be used after the gas generator 14 is replaced. In FIG. 1 the pump 22 is shown outside the gas generator 14. The liquid can be pumped out of the gas generator 14 through a fluid outlet valve 18 and back into the gas generator 14 through a fluid inlet valve 20. The fuel cell system 10 can include an optional control system for controlling the operation of the gas generator 14 and/or the fuel cell stack 12. Components of the control system can be disposed in the gas generator 14, the fuel cell stack 12, the apparatus powered by the fuel cell system, or a combination thereof. The control system can include a controller 30. Although the controller 30 can be located within the fuel cell system 10, as shown in FIG. 1, it can be elsewhere in the fuel cell system 10 or within the electric apparatus for example. The controller can communicate through a communication line 32 with the pump 22, through a communication line 34 with the stack 12, through a communication line 36 with the gas generator, and/or through a communication line 38 with the device. Sensors for monitoring voltage, current, temperature, pressure and other parameters can be disposed in those components so gas generation can be controlled based on those parameters.

Figure 2:
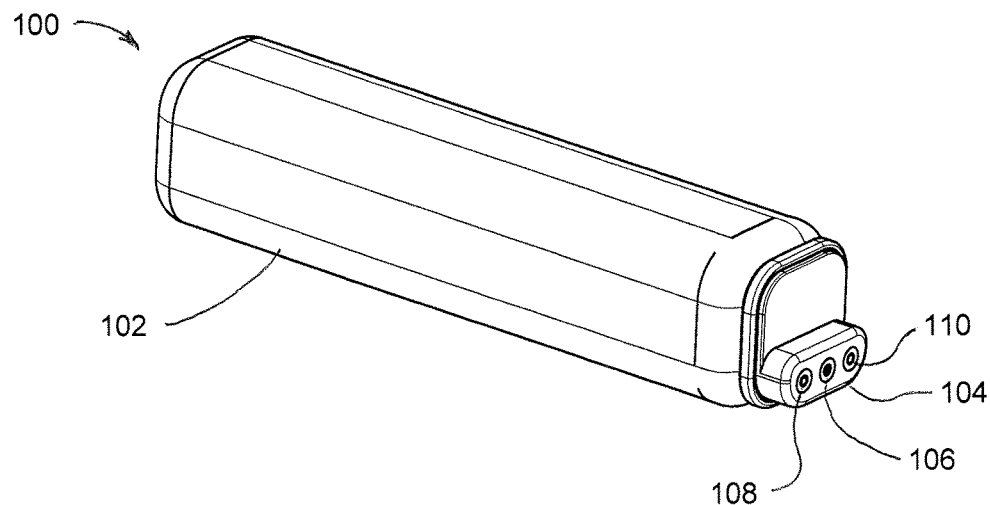
FIG. 2 is a perspective view of a gas generator including a valve assembly.

An embodiment of a removable gas generator is shown in FIG. 2. In this embodiment the gas generator 100 includes a housing 102 and a valve assembly 104 secured to an external surface for connection to other components of a fuel cell system in order to provide gas produced by the gas generator 100 to a fuel cell stack. One or more reactants that can react to produce the gas are contained within the housing 102. The valve assembly 104 includes a gas outlet valve 106 through which the gas can flow from the interior of the gas generator 100 to the rest of the fuel cell system when the gas valve 106 is in the gas supplying configuration. When the gas generator 100 is uncoupled, the gas outlet valve 106 can function as a pressure relief vent for releasing pressure from within the gas generator 100 when the gas outlet valve 106 is in the pressure relief configuration. The valve assembly 104 can include one or more gas outlet valves 106. The valve assembly can optionally include other valves, such as valves 108 and 110, as shown in FIG. 2. Valves 108 and 110 can be fluid outlet and inlet valves, respectively, for example. In such an example a fluid containing a reactant can be transported from a reservoir within the gas generator 100, through the fluid outlet valve 108, then through the fluid inlet valve 110, to a reaction chamber within the gas generator 100. The fluid can be transported by a suitable means, such as a pump located outside the gas generator 100, between the fluid outlet valve 108 and the fluid inlet valve 110.

Figure 3:
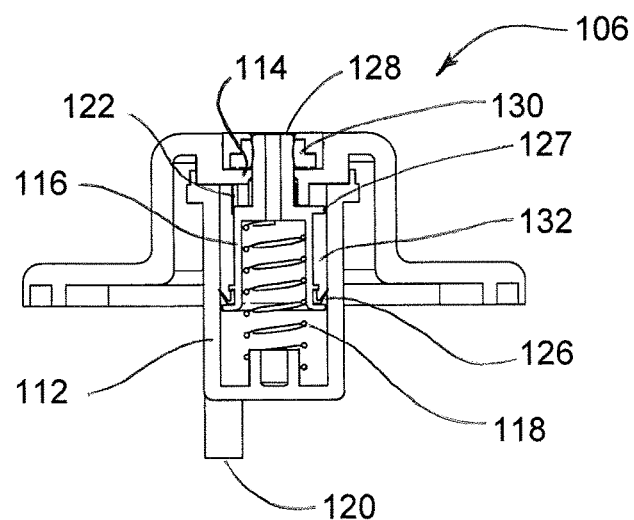
FIG. 3 is a sectional view of a gas outlet valve in a closed configuration.

A cross-sectional view of the valve assembly 104 is shown in the closed configuration in FIG. 3. The valve assembly includes the gas outlet valve 106 as well as optional fluid outlet and inlet valves 108, 110. Gas valve 106 includes a valve body 112, a valve seat 114 and a movable member 116 within the valve body 112. The movable member 116 can be in the general form of a piston that can move within the valve body 112. When the gas valve 106 is in the closed configuration, as shown in FIG. 3, the movable member 116 is biased against the valve seat 114 by a biasing member 118, such as a spring, thereby sealing the outlet port 124 of the gas outlet valve 106. Gas from the gas generator 100 can enter the gas outlet valve 106 through a tube 120 and an inlet port 122. A seal member 126 can be disposed between an exterior portion of the movable member 116 and an adjacent interior surface of the valve body 112, and a seal member 130 can be disposed between a tip 128 of the movable member 116 and the valve seat 114. The seal members 126, 130 can be O-rings, V-seals or elastomeric inserts or coatings, for example. An exterior surface of the movable member 116, an interior surface of the valve body 112 and the seal members 126, 130 define a chamber 132 within the gas outlet valve 106 into which the gas can enter. Under normal conditions, the biasing member 118 applies sufficient force to the movable member 116 to keep the tip 128 in sealing contact with the valve seat 114 to keep the gas outlet valve 106 closed and seal the gas within the gas generator 100 when the gas generator 100 is uncoupled. The movable member 116 can have radially outward extending projections 127, such as a discontinuous ring, around the circumference of the movable member 116. The projections 127 and the seal member 126 can cooperate to keep the movable member 116 properly aligned within the valve body 112 so it can move freely along a longitudinal axis of the gas outlet valve 106 and make proper contact with the valve seat 114 when the gas outlet valve 106 is in the closed configuration.

Figure 4:
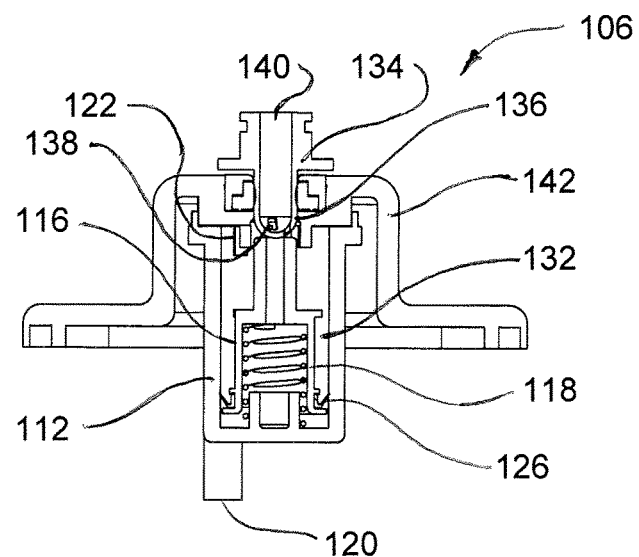
FIG. 4 is a sectional view of the gas outlet valve in a gas supplying configuration.

As shown in FIG. 4, when the removable gas generator 100 is coupled to the fuel cell system, a connector tip 134 mates with the valve assembly 104 such that the movable member 116 is pushed against the biasing member 118 with sufficient force to move the tip 128 away from the valve seat 114 and open the outlet port 124. The seal member 130, disposed on the valve seat 114 or the connector tip 134, provides a seal between the valve seat 114 and the connector tip 134 to form a seal and prevent gas from escaping to the outside environment. The connector tip 134 has a wall 136 with one or more orifices 138 therein, through which gas can flow from the gas outlet valve into an internal channel 140 in the connector tip 134 and on to the fuel cell stack. The connector tip 134 can be recessed within a sleeve (not shown) to protect the connector tip 134 from damage when the gas generator 100 is uncoupled. The sleeve can also fit around an outward projection from the gas outlet valve 106 to align the connector tip 134 with the gas outlet valve 106 when the gas generator 100 is being coupled.

Figure 5:
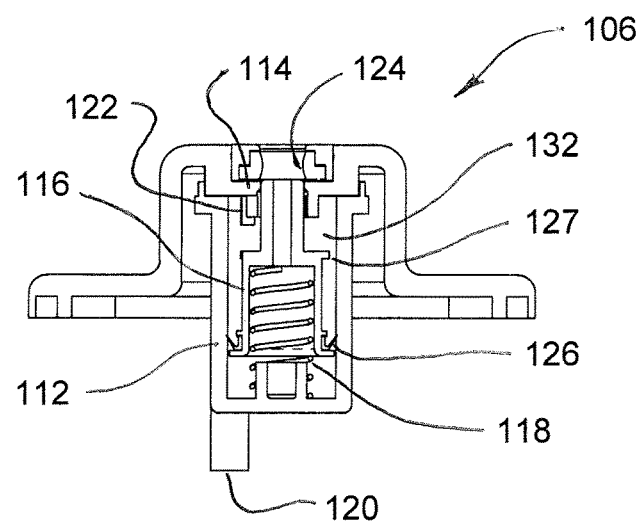
FIG. 5 is a sectional view of the gas outlet valve in a pressure relief configuration.

When the gas generator 100 is uncoupled, the gas outlet valve 106 can function as a pressure relief valve for releasing pressure from within the gas generator 100 if the internal pressure reaches or exceeds a threshold pressure. The gas outlet valve 106 is shown in the pressure relief configuration in FIG. 5. When the internal pressure reaches or exceeds the established threshold, the force of the biasing member 118 is overcome, forcing the movable member 116 back against the biasing member 118 by a sufficient amount to break contact between the tip 128 and the valve seat 114 and allow gas to escape from the gas generator, until the internal pressure drops back below the threshold and the biasing member 118 biases the tip 128 against the valve seat 114, resealing the gas generator 100. Thus, the same valve can be used to allow the flow of gas to the fuel cell system when the gas generator 100 is coupled thereto and to release excess pressure from the gas generator when the gas generator 100 is uncoupled, and the valve is not destroyed when excess pressure is released.

Figure 6:
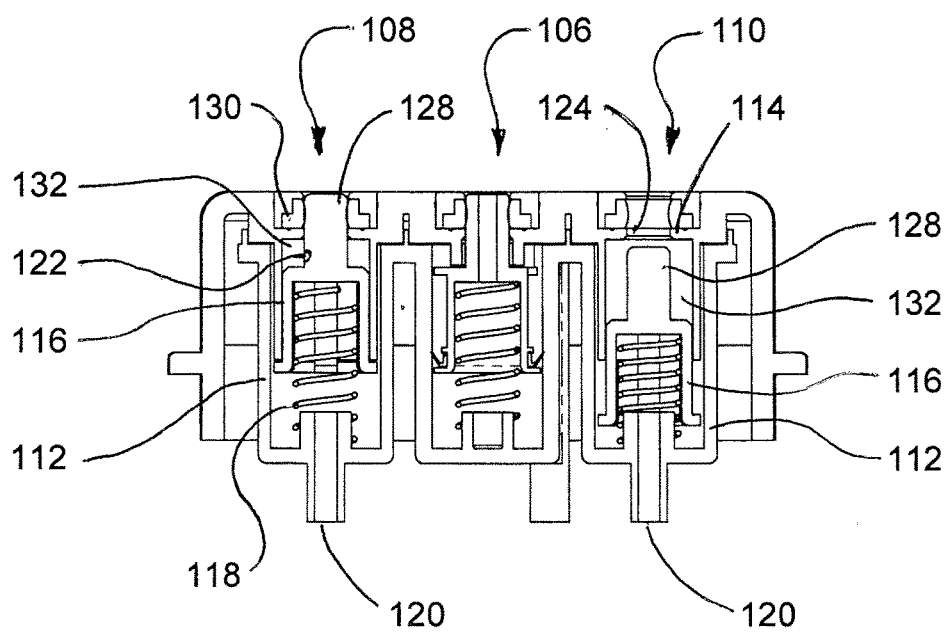
FIG. 6 is a sectional view of the valve assembly shown in FIG. 2 including a gas outlet valve.

FIG. 6 shows an embodiment of a valve assembly 104 that includes fluid outlet and inlet valves 108, 110 in addition to gas outlet valve 106. Such an arrangement can be advantageous when a fluid such as a liquid containing a reactant used in generating gas must be transferred from a storage reservoir to a reaction chamber within the gas generator 100. It allows the use of a pump that is not within the gas generator housing 102. This allows reuse of the pump, which can reduce the total cost in situations where the expected life of the pump is greater than the expected life of the gas generator 100. By including all valves in a common valve assembly, all necessary fluid connections can be made at the same time. In FIG. 6, the gas outlet valve 106 and fluid inlet valve 108 are in the closed configuration, as they would be when the gas generator 100 is uncoupled. Fluid outlet valve 110 is shown in an open configuration to illustrate the differences between the closed and open configurations. Fluid outlet and inlet valves 108, 110 are similar to gas outlet valve 106 in that they also have: a valve body 112, a valve seat 114, a movable member 116 with a tip 128, a biasing member 118 (not shown in fluid outlet valve 110), a tube 120, an inlet port 122, an outlet port 124, a seal member 130 and a chamber 132. As shown in FIG. 6, the inlet tubes 120 are centrally located, rather than being offset from a longitudinal axis of the valves 108, 110, and the inlet ports 122 are formed in the stems below the tips 128 of the movable members 116 in valves 108, 110, though other fluid inlet arrangements are possible. Because the fluid outlet and inlet valves 108, 110 do not serve a pressure relief function and do not rely on pressure within the chamber 132 to move the movable member to a pressure relief configuration, seal member 126 is unnecessary in valves 108, 110. Both the fluid outlet valve 108 and the fluid inlet valve 110 are opened by an actuator that can be similar to the connector tip 134 shown in FIG. 4 (not shown in FIG. 6 for simplicity). Fluid outlet valve 108 can also be used for filling or refilling the reservoir in the gas generator 100 with fluid when the fluid outlet valve 108 is coupled to a fluid filling unit.

All references cited herein are expressly incorporated herein by reference in their entireties. To the extent publications and patents or patent applications incorporated by reference contradict the disclosure contained in the present specification, the present specification is intended to supersede and/or take precedence over any such contradictory material.

It will be understood by those who practice the invention and those skilled in the art that various modifications and improvements may be made to the invention without departing from the spirit of the disclosed concept. The scope of protection afforded is to be determined by the claims and by the breadth of interpretation allowed by law.

The invention claimed is:

1. A gas generator for supplying a gas to an apparatus, the gas generator comprising housing, a reactant contained within an interior portion of the housing and capable of reacting to produce a gas, and a gas outlet valve, wherein:
   the gas outlet valve comprises a valve body, a valve seat, a moveable valve member, a biasing member, a gas inlet port, a gas outlet port, and a gas flow path through the valve body, the gas flow path comprising the gas inlet port and the gas outlet port;
   when the gas outlet valve is in a closed configuration and a pressure within the gas generator is below a threshold pressure, the moveable valve member is biased by the biasing member against the valve seat to block the outlet port;
   when the gas outlet valve is in a gas supplying configuration, the moveable valve member is displaced by an actuator, insertable into the gas outlet valve from outside the gas generator, such that the moveable valve member is separated from the valve seat and the outlet port is open so gas can be supplied through the gas flow path to the apparatus;
   when the gas outlet valve is in a pressure relief configuration, the pressure within the gas generator is at or above the threshold pressure, and the moveable valve member is separated from the valve seat and the outlet port is open so pressure can be released through the gas flow path to an external environment; and,
   the gas flows through the same gas flow path when the valve is in either the gas supplying configuration or the pressure relief configuration,
   said same gas flow path comprising a chamber defined by:
   the exterior surface of the movable valve member,
   an interior surface of the valve body,
   a first seal member disposed between an exterior portion of the moveable valve member and an adjacent portion of the interior surface of the valve body, and
   the gas outlet port.

2. The gas generator according to claim 1, wherein the biasing member comprises a spring.

3. The gas generator according to claim 1, wherein the gas outlet valve comprises a second seal member that forms a seal between the valve seat and the moveable valve member when the gas outlet valve is in the closed configuration.

4. The gas generator according to claim 1, wherein the moveable valve member comprises a piston that is linearly moveable along a longitudinal axis of the valve.

5. The gas generator according to claim 1, wherein the gas generator has no additional pressure relief vent.

6. The gas generator according to claim 1, wherein the gas produced comprises hydrogen.

7. A fuel cell system comprising a gas generator according to claim 1 and a fuel cell stack.

8. The fuel cell system according to claim 7, wherein the fuel cell system further comprises a coupling between the gas generator and the fuel cell stack, and the coupling comprises the actuator that displaces the moveable valve member to open the gas outlet port when the gas outlet valve is in the gas supplying configuration.

9. The fuel cell system according to 8, wherein the actuator comprises a hollow tube in fluid communication with the fuel cell, a seal is formed between an outer surface of the tube and the valve seat when the actuator is inserted into the gas outlet valve, and gas exiting the gas outlet in the valve can enter the hollow tube.

10. The fuel cell system according to claim 7, wherein the gas generator comprises a valve assembly that comprises the gas outlet valve.

11. The fuel cell system according to claim 10, wherein the valve assembly comprises a plurality of valves.

12. The fuel cell system according to claim 7, wherein the valve assembly comprises an upstanding wall projecting outward from the gas generator.

13. The fuel cell system according to claim 12, wherein the gas outlet valve is disposed radially inward of the upstanding wall.

14. The fuel cell system according to claim 1, wherein a coupling between the gas generator and the fuel cell stack comprises a sleeve, within which the actuator is recessed.

15. The fuel cell system according to claim 14, wherein an interaction between the sleeve and a radially outer surface of the upstanding wall of claim 14 provides alignment of the actuator with the gas outlet valve.

16. The fuel cell system according to claim 7, wherein the gas generator is user-removable.

17. The gas generator of claim 1, further comprising a pump configured in the housing to provide fluid to the reactant.

\* \* \* \* \*